United States Patent
Kageyama et al.

(10) Patent No.: US 12,434,263 B2
(45) Date of Patent: Oct. 7, 2025

(54) METAL COATED RESIN PARTICLES, METHOD FOR PRODUCING SAME, CONDUCTIVE PASTE CONTAINING METAL COATED RESIN PARTICLES, AND CONDUCTIVE FILM

(71) Applicant: Mitsubishi Materials Electronic Chemicals Co., Ltd., Akita (JP)

(72) Inventors: Kensuke Kageyama, Akita (JP); Kei Kinoshita, Akita (JP); Osamu Sakaya, Akita (JP)

(73) Assignee: Mitsubishi Materials Electronic Chemicals Co., Ltd., Akita (JP)

( * ) Notice: Subject to any disclaimer, the term of this patent is extended or adjusted under 35 U.S.C. 154(b) by 526 days.

(21) Appl. No.: 17/924,019

(22) PCT Filed: Jun. 24, 2021

(86) PCT No.: PCT/JP2021/023899
§ 371 (c)(1),
(2) Date: Nov. 8, 2022

(87) PCT Pub. No.: WO2022/004541
PCT Pub. Date: Jan. 6, 2022

(65) Prior Publication Data
US 2023/0173537 A1 Jun. 8, 2023

(30) Foreign Application Priority Data
Jul. 3, 2020 (JP) .................................. 2020-115826

(51) Int. Cl.
*B05D 1/30* (2006.01)
*B05D 1/38* (2006.01)

(52) U.S. Cl.
CPC ................. *B05D 1/38* (2013.01); *B05D 1/30* (2013.01); *B05D 2201/02* (2013.01)

(58) Field of Classification Search
CPC ............ C23C 18/1641; C23C 18/1651; C23C 18/285; B05D 1/30; B05D 1/38; B05D 2201/02
See application file for complete search history.

(56) References Cited

U.S. PATENT DOCUMENTS 9,982,144 B2 * 5/2018 Kageyama ............ C23C 18/31
2013/0140501 A1 6/2013 Nakabayashi et al.
(Continued)

FOREIGN PATENT DOCUMENTS

CN 1537180 A 10/2004
CN 101111903 A 1/2008
(Continued)

OTHER PUBLICATIONS

International Search Report mailed Sep. 14, 2021, issued for PCT/JP2021/023899 and English translation thereof.
(Continued)

*Primary Examiner* — Jun Li
(74) *Attorney, Agent, or Firm* — Troutman Pepper Locke LLP (57) ABSTRACT

Metal coated resin particles include: spherical core resin particles; and a metal coated layer provided on a surface of each of the core resin particles, in which the metal coated layer consists of: a first silver layer formed on the surface of each of the core resin particles; a tin intermediate layer consisting of one or more of metallic tin and/or tin compounds selected from the group consisting of tin (Sn), tin oxide ($Sn_xO_y$), and tin hydroxide ($Sn_x(OH)_y$) formed on a surface of the first silver layer (where, $0.1<x<4$, $0.1<y<5$); and a second silver layer formed on a surface of the tin intermediate layer.

10 Claims, 2 Drawing Sheets

(56) References Cited

U.S. PATENT DOCUMENTS

| | | | |
|---|---|---|---|
| 2017/0358384 A1 | 12/2017 | Kageyama et al. | |
| 2020/0062926 A1* | 2/2020 | Takahashi | H01B 1/00 |
| 2022/0293345 A1* | 9/2022 | Hamanaka | H01G 4/2325 |
| 2023/0170105 A1* | 6/2023 | Esaki | H01G 4/2325 252/520.3 |

FOREIGN PATENT DOCUMENTS

| | | | | |
|---|---|---|---|---|
| CN | 101245148 A | 8/2008 | | |
| CN | 102201520 A | 9/2011 | | |
| CN | 102667989 A | 9/2012 | | |
| CN | 108475556 A | 8/2018 | | |
| JP | H02-118079 A | 5/1990 | | |
| JP | 2003-197028 A | 7/2003 | | |
| JP | A-2005-251949 A | 9/2005 | | |
| JP | A-2008-006499 A | 1/2008 | | |
| JP | A-2015-199970 A | 11/2015 | | |
| JP | A-2016-139506 A | 8/2016 | | |
| JP | A-2018-080069 A | 5/2018 | | |
| JP | A-2019-139860 A | 8/2019 | | |
| JP | A-2019-157225 A | 9/2019 | | |
| JP | 6718722 B2 * | 7/2020 | | |
| TW | 202103186 A * | 1/2021 | | H01B 1/02 |
| WO | WO-2012023566 A1 * | 2/2012 | | C09J 11/00 |
| WO | WO-2019122366 A1 * | 6/2019 | | H01B 1/22 |
| WO | 2019/155924 A1 | 8/2019 | | |

OTHER PUBLICATIONS

Supplementary European Search Report mailed Jun. 27, 2024, issued for EP21834279.8.

Office Action mailed Jul. 29, 2024, issued for CN202180037574.4 and English translation of the Search Report.

\* cited by examiner

METAL COATED RESIN PARTICLES, METHOD FOR PRODUCING SAME, CONDUCTIVE PASTE CONTAINING METAL COATED RESIN PARTICLES, AND CONDUCTIVE FILM

TECHNICAL FIELD

The present invention relates to metal coated resin particles suitable as a conductive filler contained in a conductive material and a method for producing the same. The present invention also relates to a conductive paste and a conductive film which contain the metal coated resin particles. The present application claims priority on Japanese Patent Application No. 2020-115826 filed on Jul. 3, 2020, the content of which is incorporated herein by reference.

BACKGROUND ART

As a conductive material for replacing a lead solder or a non-lead solder, a conductive paste obtained by mixing a resin with silver coated resin particles, which are obtained by coating silver on resin particles, a conductive spacer, a conductive film, and a conductive adhesive such as a die attach film are known. The conductive adhesive is used in materials for forming electronic components such as electrodes or electric wirings included in electronic devices, electronic display devices, or semiconductor elements such as solar cell panels, liquid crystal displays, touch panels, and the like.

In the related art, silver coated spherical resin particles are disclosed (for example, see Patent Document 1 (claims 1 and 6 and paragraphs [0011], [0013], and)) [0026])), and the silver coated spherical resin particles includes spherical resin particles, a tin adsorption layer provided on a surface of each of the spherical resin particles, and silver coated on a surface of the tin adsorption layer, and the amount of silver is 2 to 80 parts by mass with respect to 100 parts by mass of the silver coated spherical resin particles, and a silver crystallite diameter measured by an X-ray diffraction method is 18 to 24 nm. The silver coated spherical resin particles are produced by a method which includes: a step of subjecting spherical resin particles to pretreatment with an aqueous solution of a tin compound; and a step of subjecting the spherical resin particles to electroless silver plating using a reducing agent, and a temperature of the aqueous solution of the tin compound in the pretreatment is set to be in a range of 20° C. to 45° C. Patent Document 1 describes that it is possible to easily produce silver coated spherical resin particles having excellent electrical conductivity and excellent silver adhesion to spherical resin particles and suitable for a conductive filler according to this method.

With regard to the silver coated spherical resin particles disclosed in Patent Document 1, in a case where a conductive paste is prepared by mixing a binder resin with these silver coated spherical resin particles and this conductive paste is coated between a circuit layer formed of, for example, copper, and a semiconductor chip, and dried and hardened to form a conductive film, the semiconductor chip is laminated and adhered to the circuit layer by this conductive film and electrical conductivity between the circuit layer and the semiconductor chip is secured by this conductive film.

PRIOR ART DOCUMENTS

Patent Document

Patent Document 1: PCT International Publication No. WO2012/023566

DISCLOSURE OF INVENTION

Problems to be Solved by the Invention

Although the silver coated spherical resin particles disclosed in Patent Document 1 have excellent silver adhesion to the spherical resin particles, in a case where a severe heat cycle is loaded to the conductive film and thermal stress repeatedly works, the thermal stress may not be sufficiently mitigated and the silver coating layer may be peeled off from surfaces of the spherical resin particles due to a difference in thermal expansion rate between the resin particles and silver. Since the electrical conductivity decreases due to this peeled-off part as a starting point of a crack of the conductive film, higher adhesion of the silver coating layer to the spherical resin particles is desired.

An objective of the present invention is to provide metal coated resin particles having excellent adhesion of a metal coated layer to core resin particles, in a case where the metal coated resin particles are used as a conductive filler in a conductive film and a severe heat cycle is loaded to this conductive film Another objective of the present invention is to provide a conductive paste capable of forming a conductive film having high electrical conductivity and thermal conductivity, and a conductive film.

Solutions for Solving the Problems

A first aspect of the present invention is metal coated resin particles including spherical core resin particles, and a metal coated layer provided on a surface of each of the core resin particles, in which the metal coated layer consists of a first silver layer formed on the surface of each of the core resin particles, a tin intermediate layer consisting of one or more of metallic tin and/or tin compounds selected from the group consisting of tin (Sn), tin oxide ($Sn_xO_y$), and tin hydroxide ($Sn_x(OH)_y$) formed on a surface of the first silver layer (where, $0.1<x<4$, $0.1<y<5$), and a second silver layer formed on a surface of the tin intermediate layer.

A second aspect of the present invention is the metal coated resin particles according to the first aspect, in which the first silver layer has an average thickness of 10 nm to 100 nm, the tin intermediate layer has an average thickness of 2 nm to 20 nm, the second silver layer has an average thickness of 50 nm to 150 nm, and an average particle size is 1 μm to 110 μm.

A third aspect of the present invention is a conductive paste including 70 mass % to 90 mass % of the metal coated resin particles according to the first or second aspect and 10 mass % to 30 mass % of a binder resin.

A fourth aspect of the present invention is a conductive paste including 10 mass % to 80 mass % of the metal coated resin particles according to the first or second aspect, 10 mass % to 70 mass % of spherical silver particles or flat silver particles having an aspect ratio (major axis/minor axis) of 5 or less, and 10 mass % to 30 mass % of a binder resin, in a case where a content of the conductive paste is set as 100 mass %.

A fifth aspect of the present invention is a conductive film formed using the conductive paste according to the third aspect.

A sixth aspect of the present invention is a conductive film formed using the conductive paste according to the fourth aspect.

A seventh aspect of the present invention is a method for producing metal coated resin particles including a step of mixing spherical core resin particles with an aqueous solution of a tin compound and adsorbing tin to a surface of each of the core resin particles to form a tin adsorption layer; a step of dripping a part of a predetermined amount of an aqueous solution containing silver salt and silver complexing agent together with a reducing agent and a pH adjusting agent to a slurry obtained by dispersing the core resin particles having the tin adsorption layer formed on the surface of each thereof in water to mix them to obtain a mixed solution, and subjecting the core resin particles to electroless silver plating in the mixed solution to substitute the tin adsorption layer with a first silver layer; a step of holding the mixed solution for a predetermined period of time while stirring the mixed solution to form a tin intermediate layer on a surface of the first silver layer; and a step of further dripping a remainder of the predetermined amount of the aqueous solution containing the silver salt and the silver complexing agent together with the reducing agent and the pH adjusting agent to the mixed solution to mix them, and subsequently subjecting the core resin particles to electroless silver plating in the mixed solution to form a second silver layer on a surface of the tin intermediate layer.

An eighth aspect of the present invention is the method for producing metal coated resin particles according to the seventh aspect, in which in a case where the predetermined amount is 100 mass %, an amount of the part of the aqueous solution containing the silver salt and the silver complexing agent is greater than 5 mass % and 70 mass % or less, and an amount of the remainder of the aqueous solution containing the silver salt and the silver complexing agent is 30 mass % or more and less than 95 mass %.

A ninth aspect of the present invention is the method for producing metal coated resin particles according to the seventh or eighth aspect, in which wherein a temperature of the aqueous solution of the tin compound is higher than 45° C. and 90° C. or lower when the spherical core resin particles are mixed with the aqueous solution of the tin compound.

Effects of Invention

The spherical metal coated resin particles of the first aspect of the present invention include the spherical core resin particles and a metal coated layer provided on the surface of each of the core resin particles. The metal coated layer consists of the first silver layer formed on the surface of each of the core resin particles, the tin intermediate layer formed on the surface of the first silver layer, and the second silver layer formed on the surface of the tin intermediate layer. Since the tin intermediate layer is provided between the first silver layer and the second silver layer, a thickness of the silver layer formed on the surface of each of the core resin particles is halved. In a case where the metal coated resin particles are used as the conductive filler in the conductive film and a severe heat cycle is loaded to this conductive film, the tin intermediate layer works to mitigate thermal stress. Accordingly, the metal coated layer is less likely to be peeled off from the surface of the core resin particle, and the metal coated layer has excellent adhesion to the core resin particle; and thereby, the conductive film having high electrical conductivity and thermal conductivity can be obtained.

In the spherical metal coated resin particles of the second aspect of the present invention, the first silver layer, the tin intermediate layer, and the second silver layer each have a thickness in the predetermined range. Accordingly, in a case where a severe heat cycle is loaded to the metal coated layer and thermal stress is repeatedly applied, the metal coated layer is less likely to be peeled off from the surface of the core resin particle, and the metal coated layer has more excellent adhesion to the core resin particles; and thereby, the conductive film having higher electrical conductivity and thermal conductivity can be obtained.

The conductive paste of the third and fourth aspects of the present invention includes the metal coated resin particles as the conductive filler. Accordingly, in a case where the conductive film according to the fifth and sixth aspects is formed with this conductive paste, and a severe heat cycle is loaded to this conductive film, it is possible to form a conductive film, in which electrical resistance or thermal conductivity does not deteriorate, as compared to a conductive film including metal coated resin particles of the related art as the conductive filler. In particular, the conductive paste of the fourth aspect further includes spherical silver particles or flat silver particles having an aspect ratio (major axis/minor axis) of 5 or less as the conductive filler. Accordingly, an effect of further increasing electrical conductivity and thermal conductivity is provided due to an increase in contact ratio of the metal coated resin particles and the silver particles.

In the method for producing metal coated resin particles according to the seventh aspect of the present invention, first, the tin adsorption layer is formed on the surface of each of the core resin particles, a part of a predetermined amount of silver salt or the like is dripped and mixed; and thereby, tin is substituted with sliver to form the first silver layer. Then, the mixed solution is held for a predetermined period of time while stirring the mixed solution; and thereby, the tin intermediate layer is formed on the surface of the first silver layer. Next, the remainder of the predetermined amount of silver salt or the like is dripped and mixed; and thereby, the second silver layer is formed on the surface of the tin intermediate layer. By doing so, the metal coated layer consisting of three layers, which are the first silver layer, the tin intermediate layer, and the second silver layer, is formed on the surface of each of the core resin particles. Since the tin intermediate layer halves the thickness of the silver layer, the tin intermediate layer mitigates thermal stress in a case where the metal coated resin particles are used as the conductive filler in the conductive film and a severe heat cycle is loaded to this conductive film. As a result, it is possible to produce metal coated resin particles in which the metal coated layer is less likely to be peeled off from the surface of the core resin particle and the metal coated layer has excellent adhesion to the core resin particle.

In the method for producing metal coated resin particles according to the eighth aspect of the present invention, in a case where the predetermined amount is 100 mass %, the amount of the part of the aqueous solution containing the silver salt and the silver complexing agent is greater than 5 mass % and 70 mass % or less, and the amount of the remainder of the aqueous solution containing the silver salt and the silver complexing agent is 30 mass % or more and less than 95 mass %. Accordingly, it is possible to control each of a thickness of the first silver layer and a thickness of the second silver layer in a desirable range.

In the method for producing metal coated resin particles according to the ninth aspect of the present invention, the temperature of the aqueous solution of the tin compound is higher than 45° C. and 90° C. or lower when the spherical core resin particles are mixed with the aqueous solution of the tin compound. Accordingly, it is possible to increase the amount of adhesion of tin to the surfaces of the core resin particles with respect to tin ions in the aqueous solution and increase the thickness of the first silver layer.

EMBODIMENTS FOR CARRYING OUT THE INVENTION

Next, embodiments for implementing the present invention will be described with reference to the drawings.
[Metal Coated Resin Particles]

Figure 1:
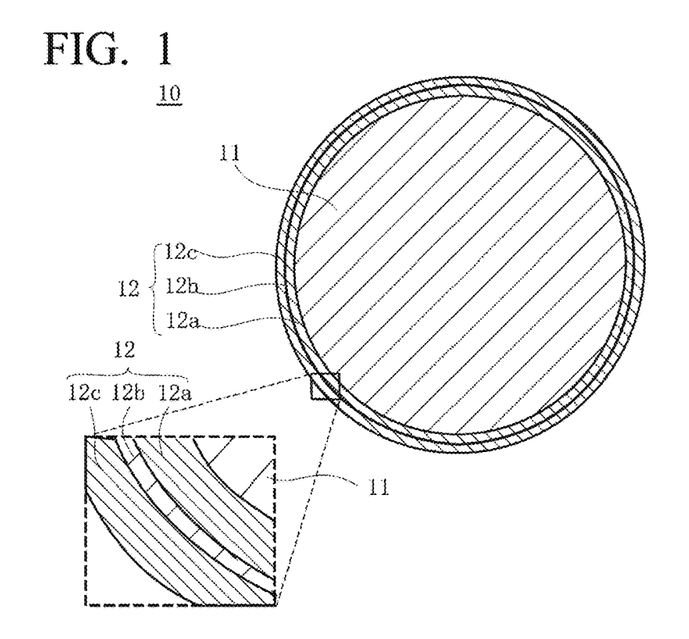
FIG. 1 is a schematic cross-sectional view showing the entire metal coated resin particle according to an embodiment of the present invention and a schematic cross-sectional view showing an enlarged part thereof.

First, spherical metal coated resin particles of the embodiment will be described. As shown in FIG. 1, spherical metal coated resin particles 10 of the embodiment includes spherical core resin particles 11, and a metal coated layer 12 which is coated on each of the spherical core resin particles 11. The metal coated layer 12 consists of a first silver layer 12a formed on a surface of each of the core resin particles 11, a tin intermediate layer 12b formed on a surface of the first silver layer 12a, and a second silver layer 12c formed on a surface of the tin intermediate layer 12b.
(Core Resin Particles)

An average particle size of the core resin particles 11 is preferably 1 μm or more and 110 μm or less and more preferably 1 μm or more and 50 μm or less. In a case where the average particle size is less than 1 μm, a surface area of the resin particles increases, and a large amount of silver is necessary to obtain electrical conductivity required as the conductive particles. In a case where the average particle size is greater than 110 μm, it tends to be difficult to apply the silver coated resin particles to a fine pattern. Considering the average particle size of the core resin particles 11 and a thickness of the metal coated layer 12 which will be described below, an average particle size of the metal coated resin particles 10 is 1 μm to 50 μm and preferably 2 μm to 30 μm. This average particle size is a volume-based median diameter measured by a laser diffraction particle size distribution meter (manufactured by Shimadzu Corporation, model name: SDLD200VER).

It is preferable that the shape of the core resin particle 11 be close to a spherical shape; however, the core resin particles 11 may be elliptical particles or slight unevenness larger than roughening recesses may be provided on surfaces of the particles. However, a sharp protrusion is not preferable, because in a case of using the metal coated resin particles in an isotropic conductive paste and an anisotropic conductive paste, it becomes a reason for impairing application of electrical conductivity and reproduction of insulation property due to a decrease in adhesion of a plating film when plating is performed, and a decrease in dispersibility in a binder when mixing is performed with the binder which is a resin. The core resin particles 11 are not limited to being solid, and may be hollow. The aspect ratio, which is a ratio of a major axis to a minor axis of the resin particles, is preferably in a range of 1 to 1.5, more preferably in a range of 1 to 1.3, and even more preferably in a range of 1 to 1.1. This aspect ratio is a value obtained by a method which includes: observing 10 particles with an electron scanning microscope (manufactured by Hitachi High-Technologies Corporation, model name: SU-1500); measuring a ratio of a major axis and a minor axis (major axis/minor axis) of each particle; and averaging these values.

As the core resin particles 11, silicone resin particles, aramid resin particles, fluororesin particles, polysulfone resin particles, polyether resin particles, polyimide resin particles, polyamideimide resin particles, epoxy resin particles, phenolic resin particles, acrylic resin particles, acrylic-styrene copolymer particles, polyurethane particles, rubber particles, styrene resin particles, and resin particles having a core-shell structure can be used. Examples of the silicone resin particles include polysilsesquioxane (PSQ) resin particles and polymethylsilsesquioxane (PMSQ) resin particles. Examples of the aramid resin particles include polymetaphenylene isophthalamide (MPIA) resin particles and polyparaphenylene terephthalamide (PPTA) resin particles. Examples of the fluororesin particles include polytetrafluoroethylene (PTFE) resin particles, tetrafluoroethylene-hexafluoropropylene-vinylidene fluoride (THV) resin particles, polyvinylidene fluoride (PVDF) resin particles, polychlorotrifluoro ethylene (PCTFE) resin particles, chlorotrifluoroethylene-ethylene (ECTFE) resin particles, tetrafluoroethylene-ethylene (ETFE) resin particles, tetrafluoroethylene-hexafluoropropylene (FEP) resin particles, tetrafluoroethylene-perfluoroalkyl vinyl ether (PFA) resin particles, and the like. Examples of the polysulfone resin particles include polyphenylene sulfide (PPS) resin particles, polyether-sulfone (PES) resin particles, and the like. Examples of the polyether resin particles include polyether ether ketone (PEEK) resin particles, polyphenylene ether (PPE) resin particles, and the like. Examples of the phenolic resin particles include novolac type phenolic resin particles, resol type phenolic resin particles, phenolic resin particles obtained by partially modifying them, and the like. Examples of the polyurethane particles include polyester-based polyurethane particles, polyol-based polyurethane particles, and the like. Examples of the rubber particles include silicone rubber particles, fluororubber particles, and the like. Examples of the resin particles having a core-shell structure include resin particles having acrylic resin core-silicone resin shell. The resin particles having acrylic resin core-silicone resin shell are produced by coating acrylic resin particles with a silicone resin film.

(Metal Coated Layer)

In the metal coated layers 12, it is preferable that, the first silver layer 12a, which is an inner layer, has an average thickness of 10 nm to 100 nm, the tin intermediate layer 12b has an average thickness of 2 nm to 20 nm, and the second silver layer 12c, which is an outer layer, has an average thickness of 50 nm to 150 nm. A more preferable average thickness of the first silver layer 12a is 10 nm to 90 nm, a more preferable average thickness of the tin intermediate layer 12b is 3 nm to 15 nm, and a more preferable average thickness of the second silver layer 12c is 60 nm to 140 nm. In a case where the average thickness of the first silver layer 12a is less than 10 nm, the tin intermediate layer 12b may be in direct contact with the core resin particle 11, and the characteristics of the metal coated resin particles are not different from those of the related art; and therefore, it is difficult to obtain the effects of the present invention. In a case where the average thickness of the first silver layer 12a is greater than 100 mu, the thickness of the metal coated layer 12, which is the sum of the thicknesses of the first silver layer, the tin intermediate layer, and the second silver layer, increases. Accordingly, the metal coated layer 12 is likely to be peeled off from the core resin particle 11, and the electrical conductivity of the metal coated resin particles 10 is likely to decrease.

In a case where the average thickness of the tin intermediate layer 12b is less than 2 nm, the effect of mitigating the thermal stress generated in the metal coated layer 12 is decreased when a thermal load is applied to the metal coated resin particles 10, and the characteristics of the metal coated resin particles are not different from those of the related art; and therefore, it is difficult to obtain the effects of the present invention. In a case where the average thickness of the tin intermediate layer 12b is greater than 20 nm, the thickness of the metal coated layer 12, which is the sum of the thicknesses of the first silver layer, the tin intermediate layer, and the second silver layer, increases, and the electrical conductivity of the metal coated resin particles 10 are likely to decrease. In a case where the thickness of the metal coated layer 12 is attempted not to increase, the thicknesses of the first and second silver layers become relatively small, and the electrical conductivity of the metal coated resin particles 10 is likely to decrease. In a case where the average thickness of the second silver layer 12c is less than 50 nm, the tin intermediate layer 12b is likely to be exposed to an outer surface of the metal coated resin particles 10, powder volume resistivity of the metal coated resin particles 10 increases, and electrical conductivity of the metal coated resin particles 10 is likely to decrease. In a case where the average thickness of the second silver layer 12c is greater than 150 nm, the thickness of the metal coated layer 12, which is the sum of the thicknesses of the first silver layer, the tin intermediate layer, and the second silver layer, increases, and the metal coated layer 12 is likely to be peeled off from the core resin particle 11.

The average thicknesses of the first silver layer 12a, the tin intermediate layer 12b, and the second silver layer 12c are obtained as follows. First, a specimen is produced by exposing a cross section of spherical metal coated resin particles 10 sprinkled on a carbon specimen stage to a thickness of approximately 100 nm using a focused ion beam apparatus (FIB). Next, 10 metal coated resin particles 10 are divided into a plurality of groups so that the entire metal coated layer 12 can be observed without overlap in a range of a surface of 5000 nm square of the core resin particles 11, and a cross-sectional shape in an interface between a metal coated layer and a core resin particle in the specimen of which the cross section is exposed is observed with an electron scanning microscope (SEM), and each of the thicknesses of the first silver layer 12a, the tin intermediate layer 12b, and the second silver layer 12c is measured, and an average value of 10 particles is set as an average thickness of each layer.

A total silver coating amount (content) of the first silver layer 12a and the second silver layer 12c with respect to the metal coated resin particles 10 depends on the average particle size of the core resin particles 11 and is determined based on a required degree of electrical conductivity, and it is preferably 2 parts by mass to 90 parts by mass with respect to 100 parts by mass of the metal coated resin particles. In a case where the content of silver is less than 2 parts by mass with respect to 100 parts by mass of the metal coated resin particles, when the metal coated resin particles are dispersed as the conductive particles, there is a risk that contact between the silver is difficult to obtain and sufficient electrical conductivity is less likely to be applied. On the other hand, in a case where the content of silver is greater than 90 parts by mass, a specific gravity increases, the cost also increases, and the electrical conductivity tends to saturate. The content of silver is more preferably 28 parts by mass to 85 parts by mass and even more preferably 28 parts by mass to 80 parts by mass. In a case where the amount of silver in the first silver layer 12a is set as 1, a ratio of the amount of silver in the second silver layer 12c is preferably 1:2 to 5.

A content of tin in the tin intermediate layer with respect to the metal coated resin particles 10 is the amount of tin contained in metallic tin and/or a tin compound that constitutes the tin intermediate layer. The content of tin depends on the average particle size of the core resin particles 11 and the coating amount of the tin intermediate layer, and is preferably 1 part by mass to 5 parts by mass with respect to 100 parts by mass of the metal coated resin particles.

[Method for Producing Metal Coated Resin Particles]

Figure 3:
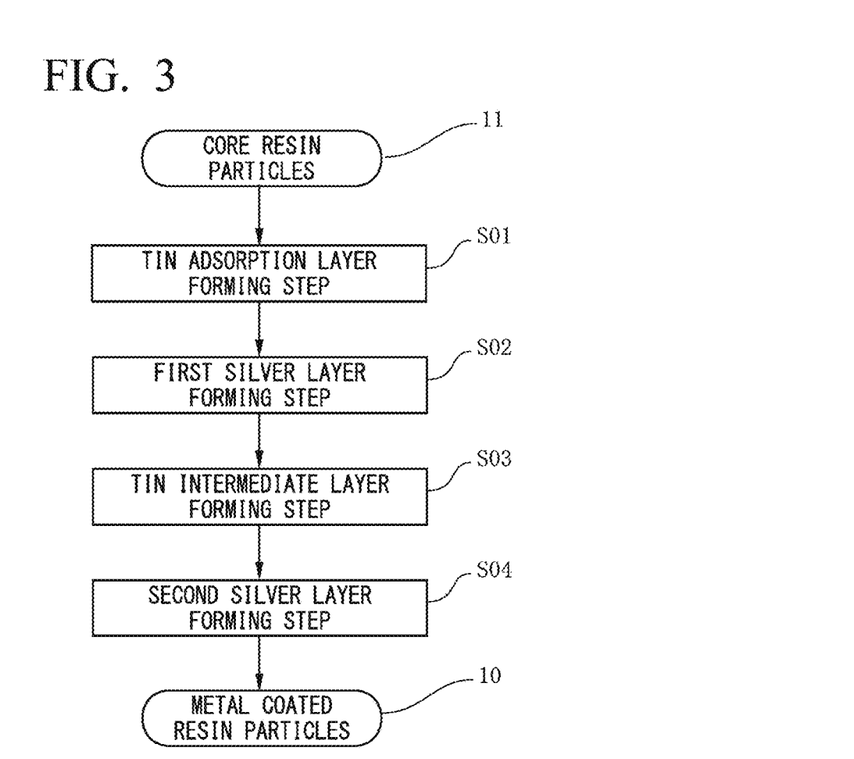
FIG. 3 is a flowchart showing a method for producing metal coated resin particles according to an embodiment of the present invention.

Next, a method for producing metal coated resin particles according to the embodiment will be described with reference to FIG. 3. As shown in FIG. 3, the producing method is a method for obtaining the metal coated resin particles 10 through a step S01 of forming a tin adsorption layer on a surface of each of the core resin particles 11, a step S02 of substituting tin in the tin adsorption layer with silver to form a first silver layer, a step S03 of forming a tin intermediate layer on a surface of the first silver layer, and a step S04 of forming a second silver layer on a surface of the tin intermediate layer.

(Tin Adsorption Layer Forming Step)

In the tin adsorption layer forming step S01, tin, which is a metal less noble than silver, is adsorbed on the surface of each of the core resin particles 11 to form the tin adsorption layer. In the tin adsorption treatment, the core resin particles are dispersed in water in advance, and an aqueous solution of a tin compound is added to this dispersion and stirred. The core resin particles 11 may be added to the aqueous solution of the tin compound and stirred. In the tin adsorption treatment, divalent ions of tin are adsorbed on the surfaces of the core resin particles 11. The core resin particles 11 to which tin is adsorbed are separated by filtration and washed with water. A time for the stirring is appropriately determined according to a temperature of the aqueous solution of the tin compound and a content of the tin compound which will be described below, and is preferably 0.5 hours to 24 hours. The temperature of the aqueous solution of the tin compound is preferably in a range of higher than 45° C. and 90° C. or lower. The temperature thereof is more preferably higher than 45° C. and 80° C. or lower. In a case where the temperature thereof is 45° C. or lower, the tin ions in the aqueous solution of the tin compound are less likely to be activated, and tin is less likely to adsorb to the surfaces of the core resin particles. The higher the temperature is within the above-described range, the more the tin ions in the aqueous solution of the tin compound are activated, the divalent tin ions are likely to be adsorbed on the surfaces of the core resin particles, and the divalent tin ions that have not been adsorbed are present in the aqueous solution. According to the tin adsorption treatment method, even for fine particles of a resin such as an acrylic resin, a phenolic resin, or a styrene resin having poor adhesion, tin sufficiently adsorbed in an initial stage is substituted with silver in an electroless plating treatment which will be described below. Accordingly, the substituted silver can adhere to a surface of the resin. However, in a case where the temperature of the aqueous solution of the tin compound is greater than 90° C., the tin compound is oxidized. Accordingly, the aqueous solution becomes unstable, and tin in the aqueous solution of the tin compound may not sufficiently adhere to the core resin particles.

Examples of the tin compound used in the tin adsorption treatment include stannous chloride, stannous fluoride, stannous bromide, stannous iodide, and the like. In a case where stannous chloride is used, a content of stannous chloride in the aqueous solution of the tin compound is preferably 10 g/dm$^3$ to 100 g/dm$^3$. In a case where the content of stannous chloride is 10 g/dm$^3$ or more, a uniform tin coating can be formed on the surfaces of the resin particles. In addition, in a case where the content of stannous chloride is 100 g/dm$^3$ or less, the amount of inevitable impurities in stannous chloride can be easily suppressed. Further, stannous chloride can be contained in the aqueous solution of the tin compound until it becomes saturated.

The aqueous solution of the tin compound preferably contains 0.5 cm$^3$ to 2 cm$^3$ of hydrochloric acid with respect to 1 g of stannous chloride. Hydrochloric acid is added as hydrochloric acid having a concentration of 35 mass %. In a case where the amount of hydrochloric acid is 0.5 cm$^3$ or more, a solubility of stannous chloride is improved and the hydrolysis of tin can be suppressed. In a case where the amount of hydrochloric acid is 2 cm$^3$ or less, the pH of the aqueous solution of the tin compound does not become too low. Accordingly, tin can be efficiently adsorbed on the resin particles.

(First Silver Layer Forming Step)

In the first silver layer forming step S02, a slurry is prepared by dispersing the core resin particles 11 having the tin adsorption layer formed on the surface of each thereof in water, a part of a predetermined amount of an aqueous solution (silver salt or the like) containing silver salt and silver complexing agent together with a reducing agent and a pH adjusting agent are dripped to the slurry to mix them to obtain a mixed solution, and the core resin particles are subjected to electroless silver plating in this mixed solution to substitute the tin adsorption layer with the first silver layer 12a (see FIG. 1). In a case where the predetermined amount is 100 mass %, an amount of a part of the silver salt or the like is preferably more than 5 mass % and 70 mass % or less and more preferably 10 mass % or more and 40 mass % or less. The amount is determined according to the thickness of the first silver layer to be formed. In the second silver layer forming step S04 described later, a remainder of the silver salt or the like is preferably 30 mass % or more and less than 95 mass % and more preferably 60 mass % or more and 90 mass % or less. A temperature of the mixed solution is preferably 15° C. to 30° C. In a case where the temperature is lower than 15° C., the crystallites of the first silver layer 12a become coarse, and in a case where the temperature is higher than 30° C., density of a silver film is lost by rapid growth of the first silver layer which is a plated coating, and the first silver layer 12a is likely to be peeled off from the core resin particle 11.

In the first silver layer forming step, the divalent ions of tin adsorbed on the surface of each of the core resin particles 11 in the tin adsorption treatment described above dissolve as tetravalent ions; and thereby, divalent electrons are released. Then, the silver ions receive the electrons and are precipitated as metal to a portion of the core resin particles to which tin has been adsorbed. After that, in a case where all the divalent ions of tin dissolve as tetravalent ions in the aqueous solution, the substitution reaction between tin and silver is completed, a catalyst is oxidized by a reducing agent by this substitution reaction, the electrons are released, the silver ions in the solution receive electrons thereof; and thereby, silver is precipitated. The surface of each of the core resin particles 11 is coated with the first silver layer 12a by the substitution reaction and the reduction reaction described above. In the initial stage of electroless plating, the adsorbed tin layer undergoes a substitution reaction between tin and silver, and after the substitution reaction is completed, the particles are coated with silver by an electroless plating reaction caused by a reducing agent. In the substitution reaction, divalent ions of tin in a part of the aqueous solution of the tin compound are substituted with silver, and the remainder of the divalent ions of tin in the aqueous solution of the tin compound is used to form the tin intermediate layer in the next stage.

As the silver salt, silver nitrate, silver dissolved in nitric acid, or the like can be used. It is preferred that the silver complexing agent is completely dissolved in a plating solution. As the silver complexing agent, salts of ammonia, ethylenediaminetetraacetic acid, tetrasodium ethylenediaminetetraacetate, nitrotriacetic acid, triethylenetetraamminehexaacetic acid, sodium thiosulfate, succinate, succinimide, citrate, and the like can be used. As the pH adjusting agent, an alkaline aqueous solution such as sodium hydroxide, potassium hydroxide, and the like can be used. As the reducing agent, formalin, glucose, Rochelle salt (sodium potassium tartrate), hydrazine and a derivative thereof, hydroquinone, L-ascorbic acid, formic acid, and the like can be used. In particular, formalin, which is an aqueous solution of formaldehyde, is preferable, a mixture of two or more of the reducing agents containing at least formaldehyde is more preferable, and a mixture of the reducing agents containing formaldehyde and glucose is most preferable.

(Tin Intermediate Layer Forming Step)

In the tin intermediate layer forming step S03, as a surplus, free tin in the mixed solution that is not completely substituted for the formation of the first silver layer 12a is precipitated on the surface of the first silver layer 12a to form the tin intermediate layer 12b. The amount of free tin in the mixed solution can be determined by analysis, and as necessary, a tin compound may be added separately to adjust a concentration of free tin. In order to form the tin intermediate layer 12b, the mixed solution is held for a predetermined period of time while stirring the mixed solution. The predetermined holding time is appropriately determined according to the temperature of the mixed solution and the amount of the free tin, and is preferably 0.5 hours to 1.5 hours. In addition, the longer the holding time is, the greater the thickness of the tin intermediate layer 12b becomes. Conversely, the shorter the holding time is, the smaller the thickness becomes. The temperature of the mixed solution is preferably in a range of 10° C. to 30° C. In a case where the mixed solution is held while stirring the mixed solution, the free tin becomes divalent ions and becomes tin hydroxide $(Sn(OH)_2)$ by the alkaline aqueous solution of the pH adjusting agent, and metallic tin and/or tin compounds is precipitated on the surface of the first silver layer 12a; and thereby, the tin intermediate layer 12b is formed. The tin intermediate layer 12b is formed of one or more of metallic tin and/or tin compounds selected from the group consisting of tin (Sn), tin oxide $(Sn_nO_y)$, and tin hydroxide $(Sn_x(OH)_y)$ (where $0.1<x<4$, $0.1<y<5$).

(Second Silver Layer Forming Step)

In the second silver layer forming step S04, the remainder (silver salt or the like) of the predetermined amount of the aqueous solution containing silver salt and silver complexing agent together with the reducing agent and the pH adjusting agent which are the same as the reducing agent and the pH adjusting agent used in the step S02 are further dripped to the mixed solution to mix them. Accordingly, the core resin particles 11 is subjected to the electroless silver plating in this mixed solution to form the second silver layer 12c on the surface of the tin intermediate layer 12b. The metal coated resin particles 10 are thus obtained. As described above, in a case where the predetermined amount is set as 100 mass %, an amount of the remainder of the silver salt or the like is preferably 30 mass % or more and less than 95 mass % and more preferably 60 mass % or more and 90 mass % or less. The amount is determined according to the thickness of the second silver layer to be formed. A temperature of the mixed solution is preferably 10° C. to 30° C. The reason why this temperature range is preferable is the same as the reason described in the step S02.

[Usage]

The metal coated resin particles 10 of the embodiment are excellent as the conductive filler, and in particular, can be optimally applied as a conductive filler of a conductive material such as a conductive adhesive, a conductive film (sheet), conductive rubber (elastomer), a conductive pressure-sensitive adhesive, a thermal interface material (TIM) such as a heat dissipation sheet or a thermal grease, or a conductive spacer.

(Conductive Adhesive)

The conductive adhesive is classified into an isotropic conductive adhesive (ICA) and an anisotropic conductive adhesive (ACA). In addition, the conductive adhesive is in a form of a paste, a film, or an ink according to the form of the binder. With regard to the isotropic conductive adhesive, in a case where the binder shrinks at the time of hardening the binder, the fillers come into contact with each other in a vertical direction, a transverse direction, and a diagonal direction. Accordingly, conductive objects to be connected are in contact with the fillers to obtain electrical conductivity. It is also possible to form a sheet with the isotropic conductive adhesive. With regard to the anisotropy conductive adhesive, the fillers are dispersed in the binder and the anisotropic conductive adhesive is interposed between conductive objects to be connected. By pressurizing this laminate in the vertical direction, the fillers between the conductive objects to be connected and the conductive objects to be connected are brought into contact with each other in the vertical direction to obtain electrical conductivity. On the other hand, in the non-pressurized portion, the fillers are arranged in the transverse direction with the binder, which is an insulator, interposed therebetween, and do not contact with each other, so that no electrical conductivity is obtained.

Examples of the conductive adhesive include an anisotropic or isotropic conductive paste, an anisotropic or isotropic conductive inks, and the like. The conductive adhesive is prepared by uniformly mixing metal coated resin particles with an insulating binder resin using a kneader such as a planetary mixer or a three-roll mill. In the conductive adhesive, the metal coated resin particles are uniformly dispersed in the insulating binder resin. A content of the metal coated resin particles is not particularly limited, and is appropriately determined according to usage or the like. In a case where the conductive paste is set as 100 mass %, it is preferable to contain 70 mass % to 90 mass % of the metal coated resin particle and 10 mass % to 30 mass % of the binder resin, in order to obtain electrical conductivity and thermal conductivity. In addition to containing the metal coated resin particles as the conductive filler, the conductive paste can further contain spherical or flat silver particles having an aspect ratio (major axis/minor axis) of 5 or less as the conductive filler. The average particle size of the silver particles is preferably 10 μm or less. In this case, in a case where the conductive paste is set as 100 mass %, it is preferable to contain 10 mass % to 80 mass % of metal coated resin particles, 10 mass % to 70 mass % of silver particles, and 10 mass % to 30 mass % of the binder resin, from a viewpoint of further increasing electrical conductivity and thermal conductivity.

The insulating binder resin in the conductive adhesive is not particularly limited, and, examples thereof include compositions that harden by heat or light such as a thermoplastic resin and a curable resin composition. Examples of the thermoplastic resin include a styrene-butadiene block copolymer, an acrylic resin, an ethylene-vinyl acetate resin, a phenoxy resin, and the like. Examples of the thermosetting resin composition include resin compositions containing a resin such as a silicone resin, an epoxy resin, or the like or a mixture thereof as main components.

(Conductive Film (Sheet))

Examples of the conductive film include an anisotropic or isotropic conductive film molded into a film shape. The conductive film is produced by first producing a resin composition in which the metal coated resin particles are dispersed in an insulating binder resin, and then coating this resin composition on a surface of a support film such as PET. The resin composition is prepared by uniformly mixing metal coated resin particles with an insulating binder resin using a kneader such as a planetary mixer or a three-roll mill. In the conductive film, the metal coated resin particles are uniformly dispersed in the insulating binder resin on the support film. Examples of the insulating binder resin in the conductive film include resin compositions containing a resin such as an acrylic resin, a silicone resin, an epoxy resin, a phenoxy resin, or the like or a mixture thereof as main components. A content of the metal coated resin particles in the resin composition in the conductive film is not particularly limited, is appropriately determined according to the usage or the like, and is preferably 0.5 mass % to 90 mass % with respect to 100 mass % of the binder resin.

(Conductive Rubber (Elastomer))

As the conductive rubber, there is a conductive rubber molded into a sheet shape or rectangular parallelepiped shape, which can be used as a heat dissipation sheet or a conductive connector. The conductive rubber is produced by first kneading binder rubber, a vulcanizing agent, and the metal coated resin particles using a twin-screw roll or the like, and then heating and pressurizing using a heating press machine or a dryer to perform vulcanizing and molding. Examples of the binder rubber in conductive rubber include nitrile rubber, acrylic rubber, styrene-butadiene rubber, silicone rubber, fluororubber, and the like. A content of the metal coated resin particles in the composition of the conductive rubber is not particularly limited, is appropriately determined according to the usage or like, and is preferably 0.5 mass % to 90 mass % with respect to 100 mass % of the binder rubber.

(Conductive Pressure-Sensitive Adhesive)

As the conductive pressure-sensitive adhesive, a conductive pressure-sensitive adhesive or a conductive gel molded into a sheet shape or rectangular parallelepiped shape is used, and the conductive pressure-sensitive adhesive can be used as an electrical contact material, a heat dissipation sheet, and an electrode. The conductive pressure-sensitive adhesive is produced by first producing a pressure-sensitive composition in which the metal coated resin particles are dispersed in a pressure-sensitive adhesive that is an insulating binder, and then coating this pressure-sensitive composition on a surface of a support film such as PET. Examples of the binder pressure-sensitive adhesive in the conductive pressure-sensitive adhesives include an acrylic pressure-sensitive adhesive, a urethane pressure-sensitive adhesive, a silicone pressure-sensitive adhesive, and the like. A content of the metal coated resin particles in the composition of the conductive pressure-sensitive adhesive is not particularly limited, is appropriately determined according to the usage or the like, and is preferably 0.5 mass % to 90 mass % with respect to 100 mass % of the pressure-sensitive adhesive.

(Thermal Grease)

As the thermal grease, there is a mixture of a non-volatile base oil and the metal coated resin particles, which can be used as a heat dissipating material. The thermal grease is prepared by uniformly mixing a base oil and the metal coated resin particles using a kneader such as a planetary mixer or a three-roll mill. Examples of the base oil used in thermal grease include silicone base oil, mineral base oil, synthetic hydrocarbon base oil, ester base oil, ether base oil, glycol base oil, and a combination thereof. A content of the metal coated resin particles in the composition in the thermal grease is not particularly limited, is appropriately determined according to the usage or the like, and is preferably 0.5 mass % to 90 mass % with respect to 100 mass % of the base oil.

(Conductive Spacer)

The conductive spacer is used in a liquid crystal display device by electrically and vertically connecting wiring portions of two upper and lower substrates with a liquid crystal material interposed therebetween and maintaining a gap between the substrates as a predetermined dimension. The conductive spacer is produced by first adding the metal coated resin particles to an insulating binder resin such as a thermosetting resin or an ultraviolet light-curable adhesive, then uniformly mixing the metal coated resin particles with the binder resin using a kneader such as a planetary mixer or a three-roll mill to prepare a resin composition, and coating the resin composition on any one or both of the wiring portions of the two upper and lower substrates to bond the two substrates to each other. A content of the metal coated resin particles is not particularly limited, is appropriately determined according to the usage or the like, and is preferably 2 mass % to 10 mass % with respect to 100 mass % of the binder resin.

EXAMPLES

Next, examples of the present invention will be described in detail together with comparative examples.

Example 1

A tin chloride aqueous solution ($SnCl_2$ aqueous solution) was prepared for tin adsorption treatment. This tin chloride aqueous solution was prepared by diluting 15 g of stannous chloride and 15 $cm^3$ of hydrochloric acid with water to 1 $dm^3$ using a volumetric flask with a capacity of 1 $dm^3$. The tin chloride aqueous solution was stored at a liquid temperature of 27° C. Hydrochloric acid with a concentration of 35 mass % was used. In addition, 33 g of silver nitrate (silver salt), 53 $cm^3$ of 25 mass % ammonia solution, and 175 $cm^3$ of water were mixed to produce 256 g of an aqueous solution of silver ammonia complex (silver salt or the like) containing silver nitrate.

Acrylic resin particles (PMMA crosslinked beads) having an average particle size of 3 μm were prepared as core resin particles. A dispersion was prepared by dispersing 9 g of the core resin particles in water, and the tin chloride aqueous solution was added to the dispersion, and the temperature was adjusted to 60° C. and the mixture was stirred at this temperature for 5 hours (tin adsorption layer forming step). After that, the core resin particles were separated by filtration and washed with water. Next, the core resin particles were dispersed again in water to prepare a slurry having a liquid temperature of 15° C., and a reducing agent (formaldehyde aqueous solution having a concentration of 35 mass %), a pH adjusting agent (sodium hydroxide aqueous solution), and 85 g of silver salt (aqueous solution of silver ammonia complex) were dripped subsequently to the slurry while stirring the slurry to prepare a mixed solution. The dropwise addition amount of the silver salt or the like was 33.3 mass %, in a case where the amount of the initially produced silver salt or the like (predetermined amount of the silver salt or the like) was set as 100 mass % (first silver layer forming step). After the dropwise addition, the mixed solution having a liquid temperature of 20° C. was held while stirring for 1 hour (tin intermediate layer forming step). Subsequently, in a case where the predetermined amount of the initially produced silver salt or the like was set as 100 mass %, the remainder of 66.7 mass % of the silver salt or the like (aqueous solution of silver ammonia complex) was dripped to the mixed solution while stirring the mixed solution having a liquid temperature of 20° C. (second silver layer forming step). As a result, the metal coated resin particles having a metal coated layer on each of the core resin particles were obtained. In a case where a cross section of the metal coated resin particle was observed with an electron scanning microscope, a three-layer structure was found, and in a case where a composition analysis was performed by energy dispersive X-ray analysis (EDX), components of the first layer and the third layer were Ag, and components in the second layer of the intermediate layer were detected as Sn and oxygen (O).

Table 1 below shows each of (1) a liquid amount, a temperature, and a stirring time of a $SnCl_2$ aqueous solution in the tin adsorption layer forming step, (2) a liquid amount of a predetermined amount of silver salt or the like (aqueous solution of silver ammonia complex), (3) a temperature of a silver salt or the like, a dropwise addition time, a rate of dropwise addition amount to the predetermined amount of silver salt or the like in the first silver layer forming step, (4) a temperature and a holding time of a mixed solution in the tin intermediate layer forming step, and (5) a temperature of a silver salt or the like, a dropwise addition time, a rate of a dropwise addition amount to the predetermined amount of silver salt or the like in the second silver layer forming step.

TABLE 1

| | Tin adsorption layer forming step S01 SnCl₂ aqueous solution | | | Predetermined amount of silver salt or the like | First silver layer forming step S02 Silver salt or the like | | | Tin intermediate layer forming step S03 Mixed solution | | Second silver layer forming step S04 Silver salt or the like | | |
|---|---|---|---|---|---|---|---|---|---|---|---|---|
| | Liquid amount (g) | Temperature (° C.) | Stirring time (hour) | Liquid amount (g) | Temperature (° C.) | Dropwise addition time (hour) | Rate of dropwise addition amount (mass %) | Temperature (° C.) | Holding time (hour) | Temperature (° C.) | Dropwise addition time (hour) | Rate of dropwise addition amount (mass %) |
| Example 1 | 40 | 60 | 5 | 33 | 15 | 0.3 | 33.3 | 20 | 1 | 20 | 0.7 | 66.7 |
| Example 2 | 40 | 80 | 5 | 38 | 15 | 0.7 | 50 | 20 | 1 | 20 | 0.5 | 50 |
| Example 3 | 40 | 90 | 5 | 33 | 10 | 0.3 | 33.3 | 20 | 1.5 | 20 | 0.7 | 66.7 |
| Example 4 | 24 | 50 | 5 | 33 | 13 | 0.1 | 33.3 | 15 | 0.5 | 20 | 1.1 | 66.7 |
| Example 5 | 60 | 80 | 5 | 33 | 16 | 0.4 | 40 | 20 | 1.5 | 20 | 0.7 | 60 |
| Example 6 | 10 | 50 | 5 | 24 | 20 | 0.5 | 25 | 22 | 1 | 20 | 1.1 | 75 |
| Example 7 | 20 | 70 | 2 | 35 | 22 | 0.4 | 33.3 | 25 | 1 | 24 | 1.1 | 66.7 |
| Example 8 | 10 | 50 | 2 | 24 | 20 | 0.5 | 33.3 | 23 | 1 | 21 | 1.5 | 66.7 |
| Example 9 | 40 | 40 | 2 | 33 | 15 | 0.05 | 5 | 20 | 0.5 | 20 | 1.1 | 95 |
| Example 10 | 10 | 50 | 2 | 5 | 15 | 0.3 | 33.3 | 19 | 1 | 19 | 0.5 | 66.7 |
| Comparative Example 1 | 40 | 20 | 5 | 33 | 17 | 1.0 | 100 | — | — | — | — | — |

Examples 2 to 10

In Examples 2 to 10, in order to change the thickness of each of the first silver layer, the tin intermediate layer, and the second silver layer, as shown in Table 1, producing conditions of each step were changed to produce metal coated resin particles.

Comparative Example 1

An example in which the entire amount of silver salt or the like (aqueous solution of silver ammonia complex) was dripped continuously at once and the tin intermediate layer was not formed was defined as Comparative Example 1.

Table 2 below shows a kind and an average particle size of the core resin particles which was a raw material of the metal coated resin particles, an average thickness of each layer configuring the metal coated layer of the metal coated resin particles, and an average particle size of the metal coated resin particles obtained in Examples 1 to 10 and Comparative Examples 1. The average thickness of each layer and the average particle size of the particles were measured by the method described above.

TABLE 2

| | Metal coated resin particles | | | | |
|---|---|---|---|---|---|
| | Core resin particles | | Metal coated layer | | |
| | Kind | Average particle diameter (μm) | Average thickness of first silver layer (nm) | Average thickness of tin intermediate layer (nm) | Average thickness of second silver layer (nm) | Average particle diameter (μm) |
| Example 1 | Acryl | 3 | 40 | 5 | 90 | 3.3 |
| Example 2 | Acryl | 3 | 100 | 5 | 50 | 3.3 |
| Example 3 | Acryl | 3 | 40 | 10 | 90 | 3.3 |
| Example 4 | Acryl | 3 | 10 | 3 | 125 | 3.3 |
| Example 5 | Acryl | 3 | 40 | 20 | 90 | 3.3 |
| Example 6 | Acryl | 10 | 70 | 5 | 130 | 10.4 |
| Example 7 | Silicone | 4 | 60 | 10 | 130 | 4.4 |
| Example 8 | Silicone | 10 | 80 | 10 | 150 | 10.5 |
| Example 9 | Acryl | 3 | 5 | 3 | 120 | 3.4 |
| Example 10 | Acryl | 160 | 60 | 10 | 120 | 160.5 |
| Comparative Example 1 | Acryl | 3 | 140 | — | — | 3.3 |

Test Example 1

In Test Example 1, 80 mass % of the metal coated resin particles of Example 1 as the conductive filler and 20 mass % of the polyfunctional epoxy resin (manufactured by ADEKA, ADEKA RESIN EP-3950S) as the binder resin were mixed with each other to prepare a conductive paste. Table 3 below shows compositions of the conductive pastes (a kind and a ratio of the metal coated resin particles, an average particle size, a shape, and a ratio of the silver particles, and a kind and a ratio of the binder resin).

TABLE 3

| | Compositions of the conductive paste (100 mass %) | | | | | | Evaluation | | |
|---|---|---|---|---|---|---|---|---|---|
| | Metal coated resin particles | | Silver particles | | | Binder resin | Bonding rate | | |
| | Kind | Mass % | Average particle diameter (μm) | Shape | Mass % | Kind | Mass % | Before test (%) | After test (%) | Thermal conductivity (W/m · K) |
| Test Example 1 | Example 1 | 80 | — | Spherical | — | Epoxy | 20 | 100 | 100 | 9 |
| Test Example 2 | Example 2 | 80 | — | Spherical | — | Epoxy | 20 | 100 | 95 | 9 |
| Test Example 3 | Example 3 | 80 | — | Spherical | — | Epoxy | 20 | 100 | 100 | 8 |
| Test Example 4 | Example 4 | 80 | — | Spherical | — | Epoxy | 20 | 100 | 80 | 10 |
| Test Example 5 | Example 5 | 80 | — | Spherical | — | Epoxy | 20 | 100 | 100 | 6 |
| Test Example 6 | Example 6 | 40 | 15 | Flat | 40 | Epoxy | 20 | 100 | 90 | 8 |
| Test Example 7 | Example 7 | 80 | — | Spherical | — | Epoxy | 20 | 100 | 100 | 8 |
| Test Example 8 | Example 8 | 40 | 10 | Flat | 40 | Epoxy | 20 | 100 | 100 | 7 |
| Test Example 9 | Example 1 | 80 | 5 | Spherical | 10 | Epoxy | 10 | 100 | 90 | 12 |
| Test Example 10 | Example 1 | 70 | 10 | Flat | 20 | Epoxy | 10 | 100 | 95 | 15 |
| Test Example 11 | Example 8 | 10 | 10 | Flat | 70 | Epoxy | 20 | 100 | 95 | 15 |
| Test Example 12 | Example 9 | 80 | — | Flat | — | Epoxy | 20 | 100 | 75 | 5 |
| Test Example 13 | Example 10 | 9 | 20 | Flat | 71 | Epoxy | 20 | 100 | 77 | 6 |
| Comparative Test Example 1 | Comparative Example 1 | 80 | — | Spherical | — | Epoxy | 20 | 100 | 60 | 3 |

Test Examples 2 to 13

Each content of the metal coated resin particles in Examples 2 to 10 was set to be the same as the content in Test Example 1, as shown in Table 3, or changed, so that conductive pastes of Test Examples 2 to 13 were prepared. Test Examples 6 and 8 to 11 show examples containing the metal coated resin particles and the silver particles.

Comparative Test Example 1

As shown in Table 3, a conductive paste of Comparative Test Example 1 was prepared using the metal coated resin particles of Comparative Example 1 alone.

Comparative Test and Evaluation

Bonded bodies were produced using 14 kinds of conductive pastes obtained in Test Examples 1 to 13 and Comparative Test Example 1, and a thermal cycle test was performed for the bonded bodies. A molded body was prepared from the above-described conductive paste and thermally cured to measure a thermal conductivity of the cured article.

(i) Thermal Cycle Test

Bonded bodies were produced using the conductive pastes obtained in Test Examples 1 to 13 and Comparative Test Example 1, and a thermal cycle test was performed for these bonded bodies. Specifically, first, each conductive paste was coated on a square copper plate having a length and width of 20 mm and 20 mm, in a pattern having a length, a width, and a thickness of 2 mm, 2 mm, and 30 μm, to form a coating film. Next, a square silicon chip having a length and a width of 2 mm and 2 mm was placed on the coating film. Next, this was placed in an electric furnace and held at a temperature of 180° C. for 30 minutes to cure the coating film and form a conductive film. Accordingly, the silicon chip was bonded to the copper plate by the conductive film to produce a bonded body. Subsequently, these bonded bodies were subjected to a thermal cycle test. In this thermal cycle test, a thermal shock tester (manufactured by Espec: TSB-51) was used, and an operation of holding at −20° C. for 5 minutes and then holding at 150° C. for 5 minutes with a liquid phase (manufactured by 3M, Fluorinert FC-43) was repeated 500 cycles for the bonded body. Then, a bonding rate of the bonded bodies before and after the thermal cycle test was measured.

A method for evaluating the bonding rate of the bonded body was performed as follows. First, the bonding rate (%)

of an interface between the copper plate and the silicon chip to the bonded body was evaluated using an ultrasonic flaw detector and calculated from the Equation (1).

$$\text{bonding rate} = (\text{initial bonding area} - \text{exfoliation area}) / \text{initial bonding area} \times 100 \quad (1)$$

The initial bonding area was an area to be bonded before bonding, that is, an area of the silicon chip. In the ultrasonic-detected image, the peeling was indicated by a white part in the bonding part. Accordingly, the area of this white part was taken as the exfoliation area. In addition, in a case where a crack occurred inside a bonding layer or at a bonding interface between the copper plate and the silicon chip, the crack was shown as a white part in the ultrasonic-detected image. Accordingly, the crack was also evaluated as the exfoliation area. The results are shown in Table 3.

Figure 2:
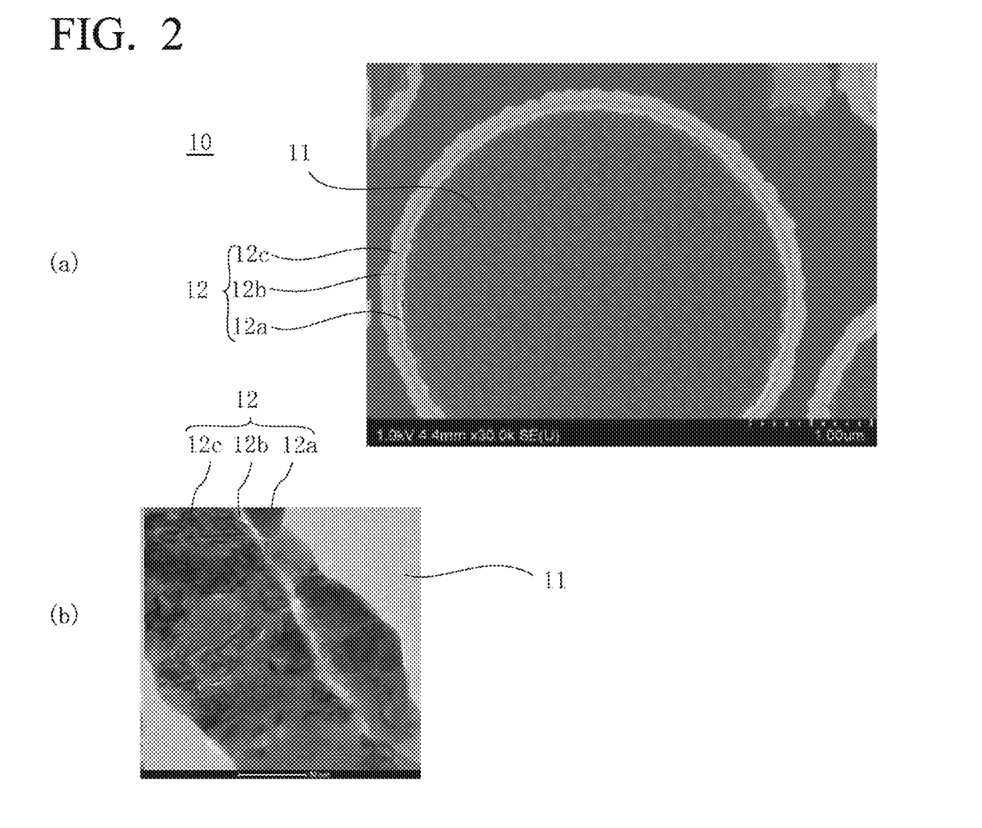
FIG. 2(a) is a photograph obtained by capturing metal coated resin particles in a conductive film by an electron scanning microscope (magnification of 30,000) after a thermal cycle test of a bonded body using a conductive paste obtained in Test Example 1.
FIG. 2(b) is a photograph obtained by magnifying and capturing a part of the first silver layer, the tin intermediate layer, and the second silver layer of the spherical metal coated resin particle shown in FIG. 2(a) by an electron transmission microscope (magnification of 100,000).

FIG. 2(a) is a photograph obtained by capturing the metal coated resin particles in the conductive film after the thermal cycle test of the bonded body using the conductive paste obtained in Test Example 1 by an electron scanning microscope (manufactured by Hitachi High-Technologies Corporation, model name: SU-1500) with magnification of 30,000, and FIG. 2(b) is a photograph obtained by magnifying and capturing parts of the first silver layer, the tin intermediate layer, and the second silver layer of the spherical metal coated resin particles shown in FIG. 2(a) by an electron transmission microscope (manufactured by JEOL Ltd., model name: JEM-2-1-F) with magnification of 100,000. Each reference numeral shown in FIGS. 2(a) and 2(b) corresponds to each reference numeral shown in FIG. 1.

Figure 4:
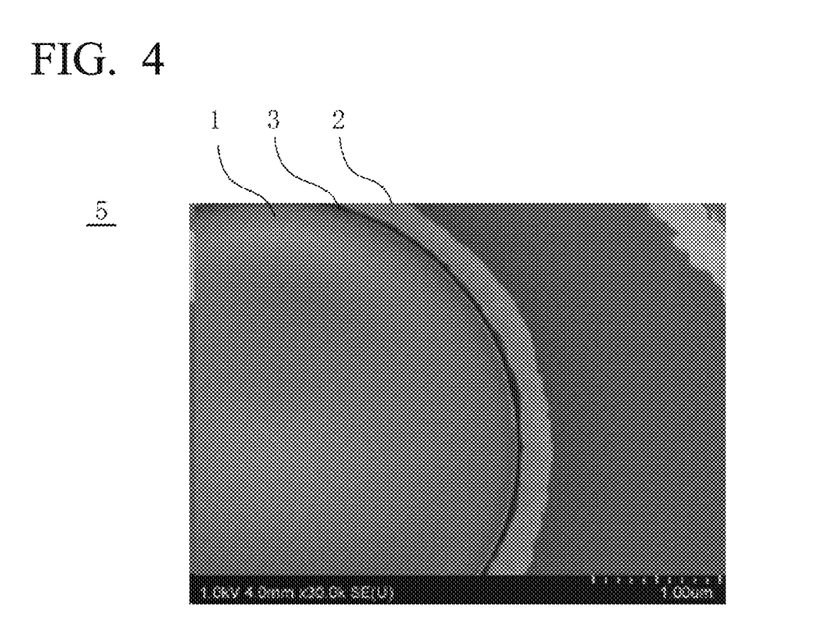
FIG. 4 is a photograph obtained by capturing metal coated resin particles in a conductive film by an electron scanning microscope (magnification of 30,000) after a thermal cycle test of a bonded body using a conductive paste obtained in Comparative Test Example 1.

In addition, FIG. 4 is a photograph obtained by capturing the metal coated resin particles in the conductive film after the thermal cycle test of the bonded body using the conductive paste obtained in Comparative Test Example 1 by an electron scanning microscope (manufactured by Hitachi High-Technologies Corporation, model name: SU-1500) with magnification of 30,000. In FIG. 4, reference numeral 1 denotes the core resin particles, reference numeral 2 denotes the metal coated layer, reference numeral 3 denotes gaps, and reference numeral 5 denotes the metal coated resin particles.

In the metal coated resin particles 5 shown in FIG. 4, the metal coated layer 2 was peeled off from the surfaces of the core resin particles 1 to form the gap 3. However, in the metal coated resin particles 10 shown in FIGS. 2(a) and 2(b), the metal coated layer 12 was not peeled off from the surfaces of the core resin particles 11.

(ii) Thermal Conductivity

Using the conductive pastes obtained in Test Examples 1 to 13 and Comparative Test Example 1, a molded body having a diameter of 10 mm and a thickness of 1 mm was produced and this was cured at 200° C. for 20 minutes to prepare test samples. A thermal diffusivity of the obtained sample was measured by a laser flash method (TC-7000 manufactured by ULVAC Co., Ltd.), and the thermal conductivity (W/m·K) was obtained from the specific heat and density. The results are shown in Table 3.

As is clear from Table 3, in the conductive paste of Comparative Test Example 1, the metal coated resin particles of Comparative Example 1 produced by a method of the related art in which the entire amount of silver salt or the like (aqueous solution of silver ammonia complex) was dripped continuously at once and the tin intermediate layer was not formed, were used. Accordingly, the bonding rate of the bonded body after the thermal cycle test was as low as 60%. In addition, it was found that the thermal conductivity of the sample produced using this conductive paste was as low as 3 W/m·K, indicating that the thermal conductivity was not excellent.

On the other hand, in Test Examples 12 and 13 in which the requirements of the first aspect of the present invention where the conductive paste was produced using the metal coated resin particles including the tin intermediate layer were satisfied, although the requirements of the second aspect of the present invention were not satisfied, the bonding rates of the bonded bodies after the thermal cycle test were 75% and 77%, which were higher than 60% that was the bonding rate in Comparative Test Example 1. The thermal conductivities of Test Examples 12 and 13 of the samples produced using these conductive pastes were 5 W/m·K and 6 W/m·K that were higher than the thermal conductivity of 3 W/m·K in Comparative Test Example 1.

In addition, in Test Examples 1 to 11, which satisfied the requirements of the second aspect of the present invention, the bonding rates of the bonded bodies after the thermal cycle test were 80% to 100%, that were higher than those in Test Examples 12 and 13. In addition, the thermal conductivity of the samples produced using the conductive pastes of Test Examples 1 to 11 was 6 W/m·K to 15 W/m·K, that was higher than those in Test Examples 12 and 13.

INDUSTRIAL APPLICABILITY

The spherical metal coated resin particles of the present invention can be used as a conductive filler of a conductive adhesive which is a conductive material for forming electronic components such as electrodes or electric wirings included in electronic devices, electronic display devices, or semiconductor elements such as solar cell panels, liquid crystal displays, touch panels, and the like.

What is claimed is:

1. Metal coated resin particles comprising:
   spherical core resin particles; and
   a metal coated layer provided on a surface of each of the core resin particles,
   wherein the metal coated layer consists of: a first silver layer formed on the surface of each of the core resin particles; a tin intermediate layer consisting of one or more of metallic tin and/or tin compounds selected from the group consisting of tin (Sn), tin oxide ($Sn_xO_y$), and tin hydroxide ($Sn_x(OH)_y$) formed on a surface of the first silver layer (where, $0.1 < x < 4$, $0.1 < y < 5$); and a second silver layer formed on a surface of the tin intermediate layer.

2. The metal coated resin particles according to claim 1, wherein the first silver layer has an average thickness of 10 nm to 100 nm, the tin intermediate layer has an average thickness of 2 nm to 20 nm, the second silver layer has an average thickness of 50 nm to 150 nm, and the spherical core resins particles have an average particle size from 1 μm to 110 μm.

3. A conductive paste comprising:
   70 mass % to 90 mass % of the metal coated resin particles according to claim 1; and
   10 mass % to 30 mass % of a binder resin.

4. A conductive paste comprising:
   10 mass % to 80 mass % of the metal coated resin particles according to claim 1;
   10 mass % to 70 mass % of spherical silver particles or flat silver particles having an aspect ratio (major axis/minor axis) of 5 or less; and
   10 mass % to 30 mass % of a binder resin, in a case where a content of the conductive paste is set as 100 mass %.

5. A conductive paste comprising:
70 mass % to 90 mass % of the metal coated resin particles according to claims 2; and
10 mass % to 30 mass % of a binder resin.

6. A conductive paste comprising:
10 mass % to 80 mass % of the metal coated resin particles according to claim 2;
10 mass % to 70 mass % of spherical silver particles or flat silver particles having an aspect ratio (major axis/minor axis) of 5 or less; and
10 mass % to 30 mass % of a binder resin,
in a case where a content of the conductive paste is set as 100 mass %.

7. A method for producing metal coated resin particles, the method comprising:
a step of mixing spherical core resin particles with an aqueous solution of a tin compound and adsorbing tin to a surface of each of the core resin particles to form a tin adsorption layer;
a step of dripping a part of a predetermined amount of an aqueous solution containing silver salt and silver complexing agent together with a reducing agent and a pH adjusting agent to a slurry obtained by dispersing the core resin particles having the tin adsorption layer formed on the surface of each thereof in water to mix them to obtain a mixed solution, and subjecting the core resin particles to electroless silver plating in the mixed solution to substitute the tin adsorption layer with a first silver layer;
a step of holding the mixed solution for a predetermined period of time while stirring the mixed solution to form a tin intermediate layer on a surface of the first silver layer; and
a step of further dripping a remainder of the predetermined amount of the aqueous solution containing the silver salt and the silver complexing agent together with the reducing agent and the pH adjusting agent to the mixed solution to mix them, and subsequently subjecting the core resin particles to electroless silver plating in the mixed solution to form a second silver layer on a surface of the tin intermediate layer.

8. The method for producing metal coated resin particles according to claim 7,
wherein, in a case where the predetermined amount is 100 mass %, an amount of the part of the aqueous solution containing the silver salt and the silver complexing agent is greater than 5 mass % and 70 mass % or less, and an amount of the remainder of the aqueous solution containing the silver salt and the silver complexing agent is 30 mass % or more and less than 95 mass %.

9. The method for producing metal coated resin particles according to claim 7,
wherein a temperature of the aqueous solution of the tin compound is higher than 45° C. and 90° C. or lower when the spherical core resin particles are mixed with the aqueous solution of the tin compound.

10. The method for producing metal coated resin particles according to claim 8,
wherein a temperature of the aqueous solution of the tin compound is higher than 45° C. and 90° C. or lower when the spherical core resin particles are mixed with the aqueous solution of the tin compound.

\* \* \* \* \*